Patented May 26, 1953

2,639,975

UNITED STATES PATENT OFFICE 2,639,975

PROCESSES FOR THE PREPARATION OF WHITE ZINC OXIDE, STARTING FROM CARBONATED ZINC ORES

Frederic Arthur Muller, Coppet, Switzerland, and Raoul Saffores, Paris, France, assignors to Carbonisation et Exploitations Forestières S. A. (C. E. F.), Geneva, Switzerland, a corporation of Switzerland No Drawing. Application April 18, 1949, Serial No. 88,234. In Switzerland April 26, 1948

6 Claims. (Cl. 23—147)

The present invention relates to a process for the preparation of white zinc oxide starting from carbonated zinc ores such as for example smithsonite.

It is known that, in order to separate these ores from their gangue, they may be dissolved in an aqueous ammonia solution. This dissolution takes place without difficulty, provided the ore be pulverised.

In the solutions thus prepared $CO_3{}^{--}$ ions, a zinc-ammonium complex the general formula of which may be represented by $[Zn_4(NH_3)]^{++}$, and free ammonia are to be found.

As these solutions contain in general impurities in solution and in suspension, it is not possible to obtain white zinc oxide, particularly an oxide suitable for the manufacture of paint without further treatment.

In fact, if after decanting or filtering of such a solution the gaseous ammonia is eliminated by heating, an almost pure zinc carbonate precipitate is obtained but tainted by traces of foreign matter which is enclosed. The oxide obtained by calcination of this carbonate is equally tainted.

The process according to the present invention allows, on the contrary, to obtain directly a perfectly white zinc oxide which is very suitable for numerous applications in which the color of the oxide is of paramount importance.

This process consists in adding to an ammoniacal solution prepared from a carbonated zinc ore and which contains zinc and $CO_3{}^{--}$ ions, a solution of a compound the cation of which forms with the said $CO_3{}^{--}$ ions an insoluble carbonate which precipitates and carries with it by absorption at least the greater part of the impurities of the ammoniacal solution; then in precipitating zinc hydroxide from the mother-liquor separately from the precipitate of the said carbonate; and in transforming the said zinc hydroxide into zinc oxide.

The compound, the cation of which forms with the $CO_3$ ions an insoluble carbonate, is a water soluble or dispersible compound of an earth-alkali metal, i. e., calcium, barium or strontium, as for instance calcium chloride, calcium hydroxide.

In order to prepare the ammoniacal solution containing zinc and $CO_3{}^{--}$ ions, one may advantageously carry out several washing operations of the carbonated zinc ore with an ammoniacal solution containing 85 to 102 grams of $NH_3$ per litre whereby it is made possible to dissolve 125 grams of zinc carbonate per litre of solution.

The compound the cation of which forms an insoluble carbonate with the $CO_3{}^{--}$ ions can advantageously be a calcium compound such as for example calcium chloride, calcium hydrate, etc.

The precipitation of the zinc compound from the mother-liquor can be effected by heating the latter in order to expel the ammonia therefrom.

It will now be described by way of example how the process according to the invention can be carried out in practice:

After having prepared, starting from smithsonite, an ammoniacal solution of zinc carbonate containing 125 grams of $ZnCO_3$ per litre, one purifies it from lead which it contains by means of a permanganate solution which forms with the lead a precipitate of manganese dioxide and of lead dioxide. One adds then a rather concentrated solution of calcium chloride (for example a solution containing 368 grams of $Cl_2Ca\ 4H_2O$ per litre) in the ratio of ½ litre per 1 litre of zinc carbonate solution.

Calcium carbonate is formed which precipitates, carrying with it by absorption the greatest part of the impurities. If, after filtering or decanting, the mother-liquor is not limpid, it can be discolored by means of animal charcoal in the ratio of 7 kgs. per cubic meter.

Subsequently the gaseous ammonia is eliminated by heating the mother-liquor, preferably in vacuo. The temperature is from 40 to 70° according to the vacuum attained. The zinc contained in the mother-liquor precipitates then in the state of hydroxide, since the reaction takes place at a pH value for which the $Zn(OH)_2$ is insoluble, this is to say at a pH value between 7 and 9.

The precipitated hydroxide is white. In general it contains zinc oxychloride in a quantity depending on the operative conditions, particularly on the temperature of the mother-liquor at the moment of eliminating the ammonia, and on the pH value of the mother-liquor. It seems that an increase in temperature favors the formation of the oxychloride $Cl.Zn.OH$, formed by the ion $Zn(OH)^+$, which is intermediate the ion $Zn^{++}$ and the hydroxide $Zn(OH)_2$. This is explained easily by the fact that at the end of the operation when the ammonia has nearly completely disappeared, the pH of the mother-liquor becomes approximately 7 and proves favorable to the formation of the oxychloride.

The precipitate is therefore composed of zinc hydroxide, zinc oxychloride and ammonium chloride. In order to obviate the formation of oxychloride one could contemplate the variation of the pH of the mother-liquor (for example by the addition of soda) but this would involve excessive expenditure. It is preferable to subject the precipitate obtained to an appropriate treatment in order to free it from the oxychloride (and perhaps from the ammonium chloride); this treatment is called for because it seems that the presence of the oxychloride is responsible for the weakening of the covering power of the zinc oxide.

One can easily eliminate the ammonium chloride and transform the oxychloride into hydroxide by treating the precipitate at ordinary temperature with a solution of soda (for example a solution of 20 grams per litre). It suffices to leave the precipitate and the solution in contact with one another during several minutes (20 to 30 minutes). The reactions are as follows:

(1) $Cl.NH_4 + OH^- \rightarrow NH_3 + H_2O + Cl^-$
(in solution)
(2) $Cl.Zn.OH + OH^- \rightarrow Zn.(OH)_2 + Cl^-$ The precipitate is then filtered, washed abundantly with water, and dried at 200° C. approximately.

The solution that served for the treatment of the precipitate may still contain a little soda as well as a little zinc. It can be returned to the manufacturing cycle (for example with the ammoniacal solution for attacking the ore).

The product obtained after drying at 200° presents itself as a very fine white powder which clings strongly to the fingers. Its composition is approximately as follows:

Zinc: 73 to 75%, in ZnO: 90.5 to 93%
Chlorine: 1 to 1.5%
$H_2O$: 6 to 8%

Instead of using a solution of calcium chloride for the precipitation of the calcium carbonate, one may use a solution or a suspension of lime.

What we claim is:

1. In a process for the preparation of white zinc oxide starting from carbonated zinc ores, the steps of treating the ores with a water solution of ammonia alone which dissolves the zinc carbonate and also carries in solution or suspension impurities derived from the ore including coloring matter, filtering to separate the solution from the gangue, adding to the filtered solution a soluble alkali earth metal salt for precipitating a carbonate of said metal, whereby said precipitate carries with it by absorption at least the greater part of the coloring matter of the solution, separating the mother liquor from the precipitated carbonate and materials associated therewith, expelling the ammonia from the mother liquor to precipitate zinc hydroxide and transforming the latter into zinc oxide.

2. A process according to claim 1, in which the ammoniacal solution after treatment of the ore therewith contains lead and is purified by an addition of a solution of potassium permanganate, the lead and the manganese being precipitated in the form of dioxides.

3. A process according to claim 1, in which the mother-liquor is heated between 40 and 70° C. and in vacuo in order to expel the ammonia and to precipitate the zinc hydroxide.

4. A process according to claim 1, in which an ammoniacal solution containing approximately 125 grams of zinc carbonate per litre is used, and in which a solution of calcium chloride containing approximately 368 grams of $CaCl_2, 4H_2O$ per litre, is added to the ammoniacal solution at the ratio of ½ volume of the solution of $CaCl_2$ to 1 volume of ammoniacal solution.

5. A process according to claim 1 in which the soluble salt of an alkali earth metal is calcium chloride.

6. A process according to claim 1 in which the solution is heated to expel the ammonia therefrom.

FREDERIC ARTHUR MULLER.
RAOUL SAFFORES.

References Cited in the file of this patent

UNITED STATES PATENTS

| Number | Name | Date |
|---|---|---|
| 547,587 | Petraeus | Oct. 8, 1895 |
| 654,804 | Rigg | July 31, 1900 |
| 715,804 | Howard | Dec. 16, 1902 |
| 863,411 | MacIvor | Aug. 13, 1907 |
| 1,198,241 | Lance | Sept. 12, 1916 |
| 1,204,843 | Bretherton | Nov. 14, 1916 |
| 1,579,302 | Gidden | Apr. 6, 1926 |
| 1,694,710 | Lenander | Dec. 11, 1928 |
| 1,863,700 | Seguine | June 21, 1932 |

FOREIGN PATENTS

| Number | Country | Date |
|---|---|---|
| 17,623 | Great Britain | 1888 |
| 4,702 | Great Britain | 1911 |
| 19,340 | Great Britain | 1913 |
| 278,411 | Great Britain | Oct. 13, 1927 |
| 453,318 | Great Britain | Sept. 9, 1936 |

OTHER REFERENCES

J. W. Mellor's "A Comprehensive Treatise on Inorganic and Theoretical Chemistry," vol. 4, 1923 Ed., pp. 522–524. Longmans, Green and Co. N. Y., Publ.